April 22, 1952     R. E. PIERCE     2,594,207
BAG CLOSURE APPARATUS Filed Jan. 7, 1949     10 Sheets-Sheet 1

FIG. I.

Robert E. Pierce,
Inventor,
Haynes and Koenig.
Attorneys.

April 22, 1952  R. E. PIERCE  2,594,207
BAG CLOSURE APPARATUS
Filed Jan. 7, 1949  10 Sheets-Sheet 4

Robert E. Pierce,
Inventor,
Haynes and Koenig,
Attorneys.

Robert E. Pierce,
Inventor,
Haynes and Koenig,
Attorneys.

April 22, 1952  R. E. PIERCE  2,594,207
BAG CLOSURE APPARATUS
Filed Jan. 7, 1949  10 Sheets-Sheet 6

Robert E. Pierce,
Inventor,
Haynes and Koenig,
Attorneys.

April 22, 1952 R. E. PIERCE 2,594,207
BAG CLOSURE APPARATUS
Filed Jan. 7, 1949 10 Sheets-Sheet 7

Robert E. Pierce,
Inventor,
Haynes and Koenig,
Attorneys.

April 22, 1952  R. E. PIERCE  2,594,207
BAG CLOSURE APPARATUS
Filed Jan. 7, 1949 10 Sheets-Sheet 8

Robert E. Pierce,
Inventor,
Haynes and Koenig,
Attorneys.

Patented Apr. 22, 1952

2,594,207

UNITED STATES PATENT OFFICE 2,594,207

BAG CLOSURE APPARATUS

Robert E. Pierce, Glendale, Mo., assignor to Bemis Bro. Bag Company, St. Louis, Mo., a corporation of Missouri Application January 7, 1949, Serial No. 69,691

23 Claims. (Cl. 112—10)

This invention relates to bag closure apparatus and, more particularly, to apparatus for forming closures at the ends of tubular bag blanks to form closed bags.

Among the several objects of the invention may be noted the provision of an improved semi-automatic bag closure forming apparatus for closing both ends of tubular bag blanks, particularly by means of adhesively applied closure tapes and stitching, which is quickly and readily adjustable for operation upon bag blanks of different lengths; the provision of apparatus of the class described wherein both ends of bag blanks of different widths and lengths may be closed in a single pass of each blank through the apparatus and wherein bag blanks may be fed rapidly through the apparatus to attain high production rates; the provision of apparatus of this class wherein only a single and easily made manual adjustment is necessary to adjust the various elements of the apparatus for operation on the bag blanks of different lengths; the provision of apparatus of this class which is readily adjustable for operation on the bag blanks of different widths; and, the provision of apparatus of this class embodying an improved mechanism for severing the closure tapes and stitching strands between successive bags which eliminates the possibility of bag blanks becoming jammed in the apparatus and which is particularly suitable for operation upon valved bags. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated.

Similar reference characters indicate corresponding parts throughout the several views of the drawings.

Figure 1:
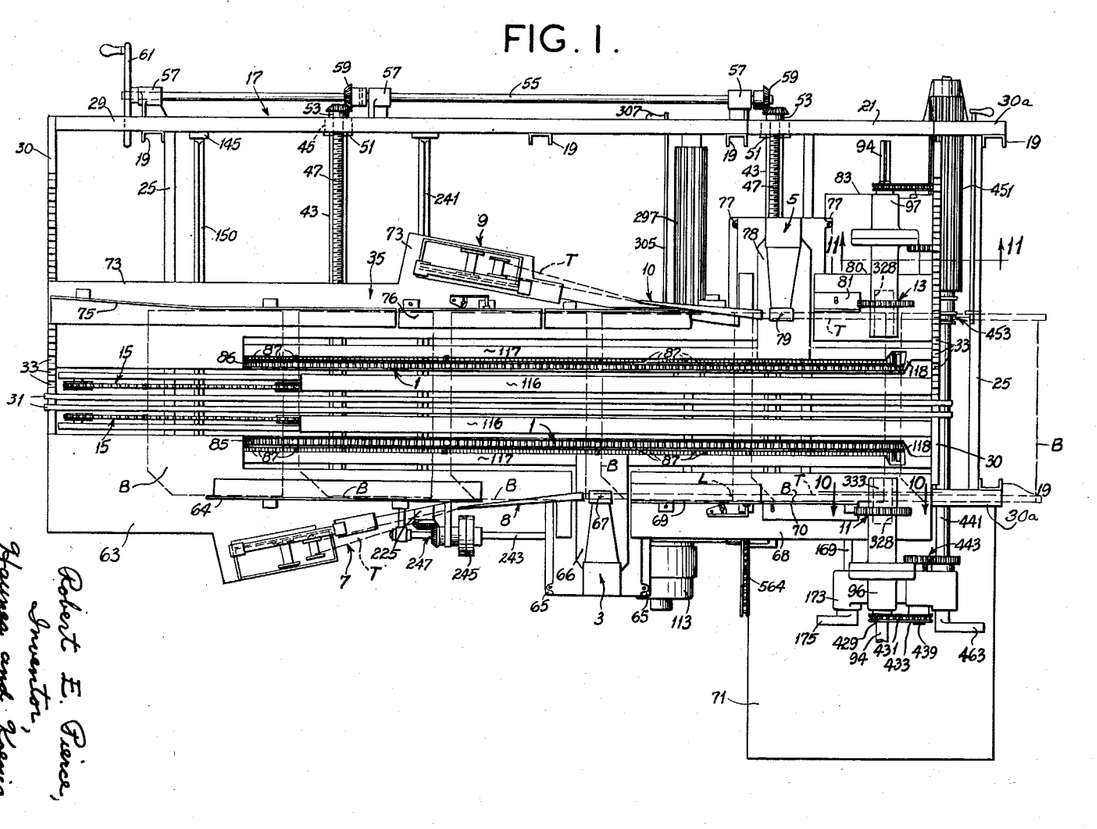
Fig. 1 is a plan view of the apparatus of this invention with bag blanks and closure tapes shown in dotted lines.

Referring to the drawings, and more particularly to Fig. 1, the apparatus of this invention is shown generally to comprise a horizontal conveyor 1 for moving open-ended flat tubular bag blanks B in a direction transverse to their length to cause the ends of the blanks to travel under the needles of opposed sewing machines 3 and 5 mounted on opposite sides of the conveyor. Mounted on opposite sides of the apparatus rearward of the sewing machines are opposed tape-supplying devices 7 and 9 for supplying bag closure tapes to tape folding devices 8 and 10 which fold the tapes around the ends of the blanks, prior to the passage of the blanks through the sewing machines, so that the tapes become stitched to the blanks. The tapes are also adhesively secured to the blanks, as will be made clear. Mounted on opposite sides of the conveyor forward of the sewing machines are opposed cutters or clippers 11 and 13 for severing the closure tapes and stitching strands between adjacent bag blanks issuing from the sewing machines. Rearward of the conveyor 1 is an auxiliary conveyor 15 for delivering bag blanks to the conveyor 1.

The sewing machines, tape-supplying devices and cutters are referred to as opposed in the sense of being positioned to operate at opposite ends of the bags, and not in the sense of being in direct transverse alignment. Actually, the tape-supplying devices and sewing machines are staggered longitudinally.

Figure 4:
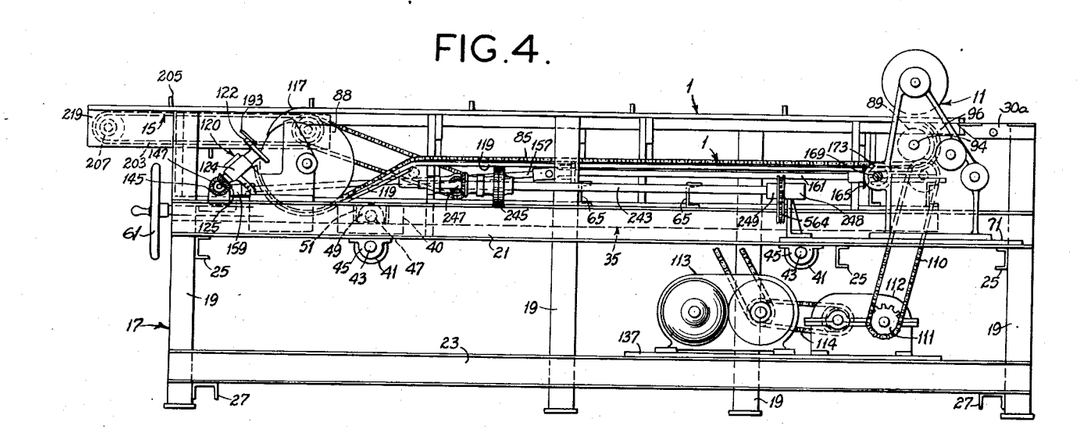
Fig. 4 is a right side view of certain parts of the apparatus shown in Figs. 2 and 3.

More particularly, the apparatus comprises an elongate table 17 having legs 19 braced by upper and lower longitudinal bracing members 21 and 23 and upper and lower transverse bracing members 25 and 27 (Fig. 4). The table top is spaced above the upper longitudinal braces 21 and consists of side and end frame members 29 and 30. Members 29 extend from the left end of the table as viewed in Figs. 1 and 2 to 29a (see Fig. 2). The end frame member 30 at the right end of the table is supported by members 30a fixed to the upper ends of the legs 19 at the right end of the table. The end members support a plurality of transversely spaced bars 31 extending longitudinally of the table. The bag blanks moved along by the conveyors 15 and 1 slide on these bars 31. The latter are loosely mounted at their end in vertical slots 33 in the end members 30 of the table and may be spaced closely together when short bag blanks are to be operated upon, or spread apart when longer bag blanks are to be operated upon.

The sewing machine 3, the tape-supplying and folding devices 7 and 8 and the clipper 11 are all fixed upon the table at the right thereof (as viewed in the direction of travel of the bag blanks) for closing the right-hand ends of the bag blanks. The sewing machine 5, the tape-supplying and folding devices 9 and 10 and the clipper 13 are all carried by a frame, generally designated 35, which is mounted for adjustment transversely of the table toward and away from the fixed elements 3, 7, 8 and 11.

Figure 2:
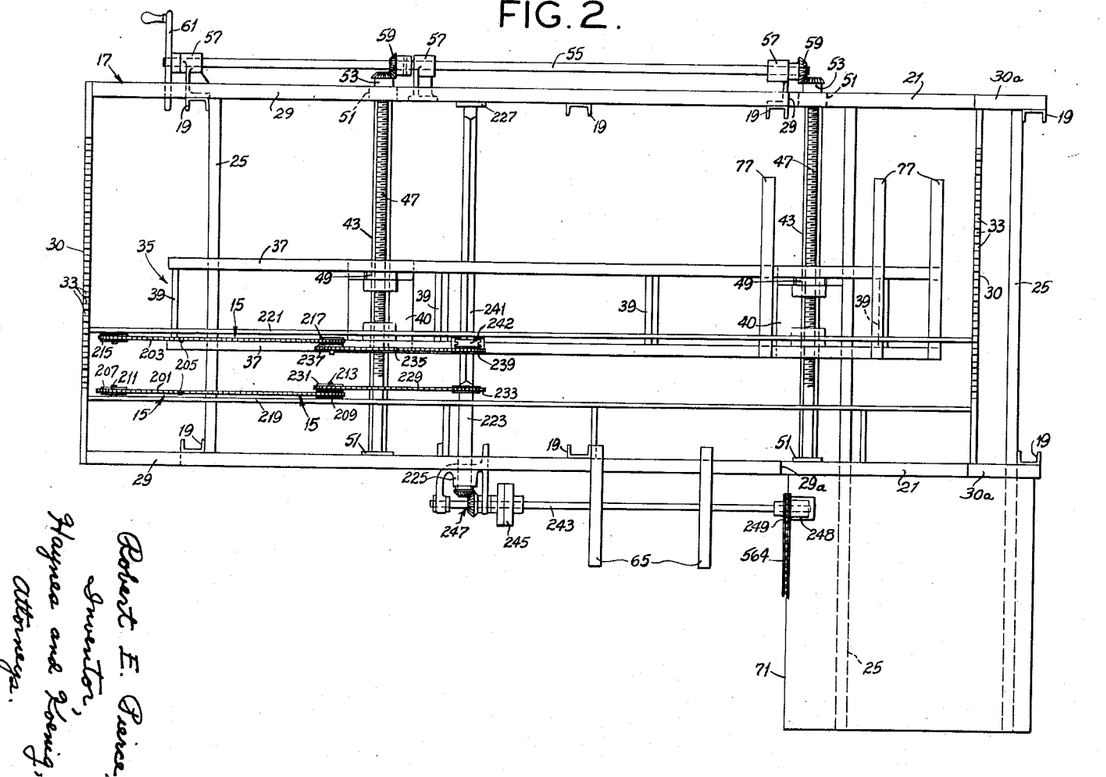
Fig. 2 is a plan view of certain parts of the apparatus particularly illustrating an adjustable frame and an auxiliary conveyor of the apparatus.
Figure 5:
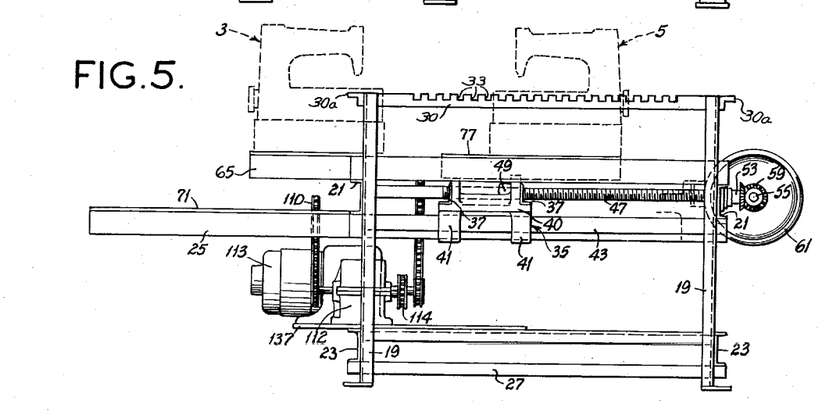
Fig. 5 is an end view illustrating the adjustable frame.

The adjustable frame 35 comprises a pair of longitudinal beams 37 tied together by transverse beams 39. The frame is carried by guide blocks 40 having guides 41 which are slidable on transverse guide rods 43 extending from side to side of the table (Figs. 2, 4 and 5). The guide rods 43 are mounted at their ends in brackets 45 depending from the upper longitudinal bracing members 21 (Fig. 4). Means for adjusting the frame 35 is shown to comprise a pair of long screws 47 extending transversely of the table through nuts 49 fixed in the blocks 40. The screws are journalled at their ends in thrust bearings 51 in the upper longitudinal bracing members 21. Each screw has a bevel gear 53 fixed on its end extending outward from the bracing member at the left of the table. A shaft 55 is journalled in bearings 57 to extend longitudinally along the left side of the table and has bevel pinions 59 fixed thereon in mesh with the gears 53. On the end of the shaft at the rearward end of the table is fixed a crank wheel 61. By turning the wheel in one direction or the other, the entire frame 35 may be adjusted toward or away from the right side of the table.

As illustrated in Fig. 1, the tape-supplying and folding devices 7 and 8 are carried by a rear bed plate 63 which is fixed upon the table to extend longitudinally along the right side of the table top. A guide 64 is fixed to the plate 63 in position to guide the right-hand ends of bag blanks fed through the apparatus. The sewing machine 3 is mounted upon a pair of transverse beams 65 cantilevered outward from the longitudinal right side member 21. Its work plate 66 is at the level of the plate 63 and its needle 67 is positioned to stitch the right-hand ends of bag blanks issuing from the tape folding device 8. A bed plate 68, fixed upon the table framework forward of the sewing machine, carries edge guides 69 and 70 for the right-hand ends of the bag blanks. A platform 71 extends to the right at the forward end of the apparatus upon extensions of a pair of upper transverse bracing members 25. The clipper 11 is mounted on the platform 71 forward of the forward edge guide 70 in position to sever the tape and stitching strand applied to the right-hand ends of the bag blanks between successive bag blanks, as will be made clear.

The adjustable frame 35 carries a rear bed plate 73 at the level of the bed plate 63. The plate 73 extends longitudinally of the table forward beyond the end of plate 63 and carries the tape supplying and folding devices 9 and 10. An edge guide 75 for the left-hand ends of bag blanks is fixed upon the bed plate 73. Another edge guide 76 is mounted intermediate the guide 75 and the tape folder 10 substantially opposite the right folder 8. The left tape folder 10 is staggered forward of the right tape folder 8 so that it is substantially opposite the right edge guide 69. The sewing machine 5 is mounted upon a pair of transverse beams 77 cantilevered outward from the longitudinal beams 37 of the adjustable frame. It extends transversely of the table, forward of the tape folding device 10 with its work plate 78 at the level of the bed plate 73 (and plate 63) and with its needle 79 positioned to stitch the left-hand ends of the bag blanks.

The clipper 13 is mounted upon the adjustable frame 35 forward of the sewing machine in transverse alignment with the clipper 11 for severing the tape and the stitching strand applied to the left-hand ends of bag blanks between successive blanks. A bed plate 80 carrying a bag guide 81 is mounted forward of the sewing machine 5 level with the work plate thereof. The clipper 13 is mounted upon a platform 83 cantilevered outward to the left from the longitudinal beams 37 of the adjustable frame 35.

The primary conveyor 1 is provided to feed the bag blanks through the apparatus by pushing them one after another along the top of the table. It is preferably of the general type disclosed in U. S. Patent 2,450,106 to provide for proper longitudinal spacing of blanks of different widths, with modifications to allow for proper feeding of blanks of different lengths, as will be made clear. The conveyor 1 comprises right and left hand parallel endless chains 85 and 86, each of which carries a plurality of lugs 87 at closely spaced intervals along its length.

Figure 3:
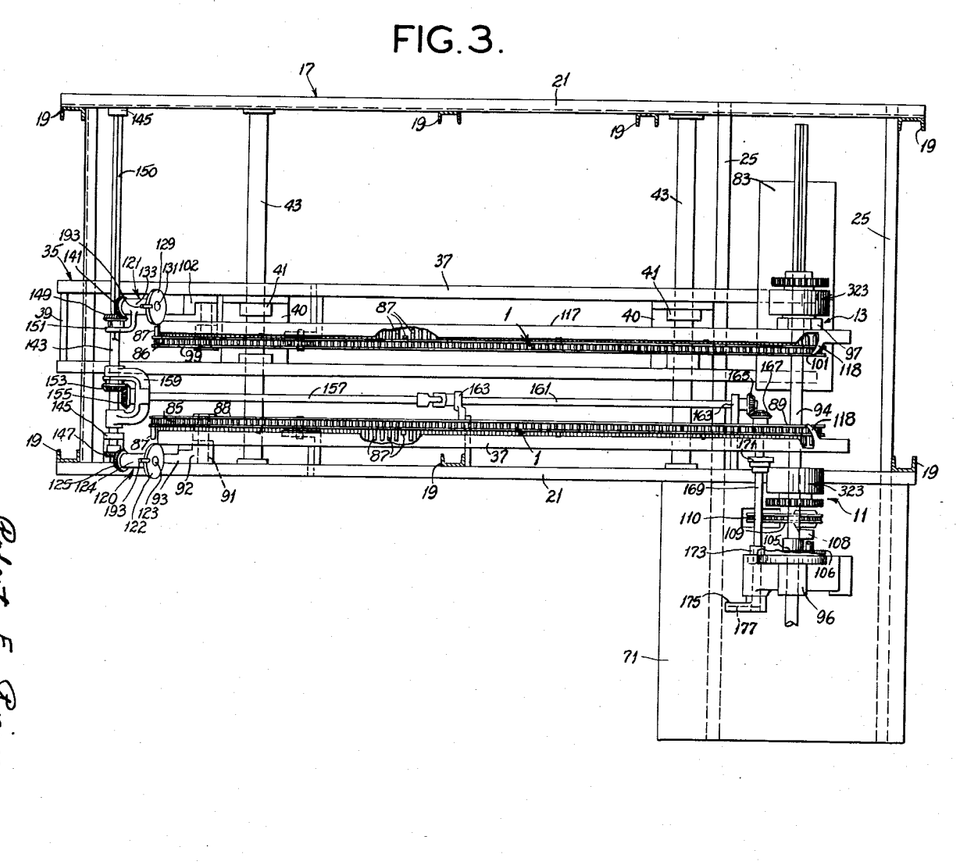
Fig. 3 is a plan view of certain parts of the apparatus particularly illustrating a primary conveyor.

The right-hand chain 85 is mounted for travel in a fixed vertical plane on rear and forward sprockets 88 and 89 (Figs. 3 and 4). The rear sprocket 88 is carried by a stub shaft 91 journalled in a bearing 92 formed in a bracket 93 fixed to the right-hand side of the table. The forward sprocket 89 is fixed on a conveyor drive shaft 94 which extends transversely across the table, being journalled at its right in a bearing pedestal 96 mounted on the fixed platform 71 and at its left in a bearing pedestal 97 mounted on the platform 83 which is transversely movable with the adjustable frame 35.

Figure 12:
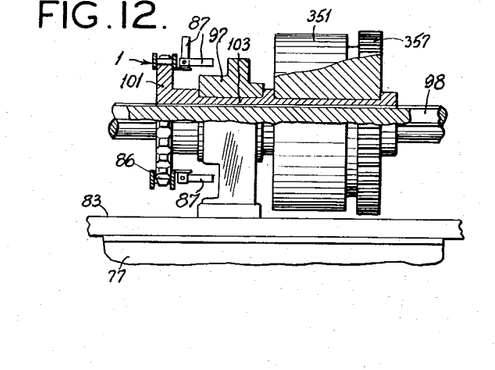
Fig. 12 is an enlarged partial section of a left bearing pedestal for a conveyor drive shaft.

The left-hand chain 86 is trained around rear and forward sprockets 99 and 101, both of which are movable with the adjustable frame 35 so that the chain 86 is movable transversely toward and away from the chain 85. This is for the purpose of providing for different transverse spacings of the two chains in accordance with the lengths of bag blanks being fed—it being desirable to have the feeding lugs 87 of the two chains spaced the same distance inward from the ends of the blanks for all the different lengths of bags which may be manufactured. The left rear sprocket 99 is rotary in a bracket 102 mounted upon the adjustable frame 35. The left forward sprocket 101 is keyed to an internally splined sleeve 103 journalled in the movable bearing pedestal 97 and movable transversely with the latter (Fig. 12). The shaft 94 has a splined portion 98 at the left which extends through the internally splined sleeve so that the sleeve and the sprocket 101 are driven by the shaft and axially movable thereon.

Figure 10:
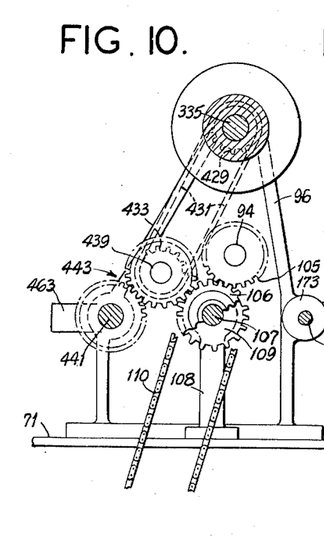
Fig. 10 is an enlarged section taken on the line 10—10 of Fig. 1.
Figure 11:
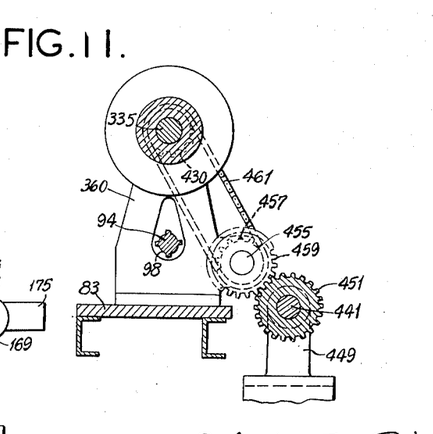
Fig. 11 is an enlarged section taken on the line 11—11 of Fig. 1.

As shown in Figs. 3 and 10, a gear 105 is fixed on the shaft 94 adjacent the inner side of pedestal 96. The gear 105 meshes with a gear 106 fixed on a sprocket shaft 107 which is journalled in the pedestal 96 and in a pedestal 108 spaced inwardly from pedestal 96. A sprocket 109 fixed to the inner end of shaft 107 is driven by a chain 110 from a sprocket 111 on the output shaft of speed reducer 112 (Fig. 4). The speed reducer 112 in turn is driven by a variable speed motor unit 113 through a chain drive generally indicated at 114. The units 112 and 113 are mounted upon a platform 137 carried by the lower longitudinal beams 23.

The chains 85 and 86 are of similar form, each of the lugs 87 of both chains being pivoted to a link of the respective chain for pivotal movement between a retracted position wherein it extends laterally outward from the chain and a feeding position wherein it extends vertically upward from the chain. The sprockets are so arranged that the upper reaches of the chains travel horizontally just below the level of the bed plates 63 and 73 from a point adjacent the rear end of the table to a point past the clippers. Any two transversely aligned lugs 87 of the two chains are adapted to be swung to feeding position extending vertically upward from the upper reaches of the chains for pushing a bag blank along the table top. It is desirable to have uniform spacing between bag blanks of different widths, consequently the conveyor is provided with means whereby the longitudinal spacing of the successive lugs in feeding position may be readily varied. This means is of the same type as disclosed in the aforesaid U. S. Patent 2,450,106, and reference may be made to this patent for details. A general description of this means and how it is modified to allow for transverse adjustability of the left chain 86 follows:

Along the upper reaches of each chain are inner and outer guides 116 and 117 between which the upright lugs 87 may travel. At the forward ends of these guides (and the upper reaches of the chains) are cams 118 for swinging the upright lugs 87 to their retracted position as they travel around the forward sprockets 89 and 101. Chain supports 119 are provided along the lower region of the chain to hold the lugs in lateral position during their return to the rear of the apparatus. The guides 116 and 117, and the support 119 for the left chain 86 are carried by the movable frame 35. At the rearward ends of the chains are tripping mechanisms 120 and 121 acting upon pre-selected lugs of the chains 85 and 86, respectively, for swinging them into feeding position for travel between the guides 116 and 117 as the lugs move around the rear sprockets 88 and 99. The tripping mechanism 120 at the right is fixed in position with respect to the table. The tripping mechanism 121 at the left is mounted upon and moves with the adjustable frame 35.

The tripping mechanism 120 comprises a rotary tripping head 122 on the upper end of a shaft 123 journalled in an angled bearing 124. The latter is carried by the bracket 93. On the lower end of the shaft 123 is a bevel gear 125. The tripping mechanism 121 comprises a similar rotary tripping head 129 on the upper end of a shaft 131 journalled in an angled bearing 133. The latter is carried by the bracket 102 fixed to the adjustable frame 35. On the lower end of the shaft 131 is a bevel gear 141. A shaft 143 extends transversely of the table, being journalled at its ends in bearings 145 mounted on the upper longitudinal table bracing members. The bevel gear 125 meshes with a bevel pinion 147 fixed on this shaft. The bevel gear 141 meshes with a bevel pinion 149 which is slidable on a squared section 150 of the shaft 143 so as to rotate therewith in any position to which it may slide. A shifting fork or collar 151 extending from the bearing 133 straddles the hub of the bevel pinion 149 so that the latter slides on the shaft 143 with the tripping mechanism 121 as the frame 35 is adjusted.

The shaft 143 is driven by a drive including a bevel gear 153 fixed thereon in mesh with a bevel pinion 155 on the rearward end of a lay shaft 157 (Fig. 3). A yoke 159 properly relates the gear 153 and pinion 155, and also the shafts 143 and 157. The lay shaft at its forward end is coupled by a universal joint to a shaft 161 extending longitudinally of the table and journalled in bearings 163 mounted on the table framework. At its forward end, shaft 161 carries a bevel gear 165 in mesh with a bevel gear 167 on a transverse shaft 169 which extends outward to the right of the table, being journalled in bearings 171 and 173, the latter in pedestal 96. At its outer end, shaft 169 has a crank arm 175 in which is a slot 177. The crank arm 175 forms a part of an adjustable swinging-block linkage to be described.

The tripping heads rotate in opposite directions, the head 122 rotating clockwise as viewed in Fig. 3. They have lug-engaging fingers 193 thereon. During each revolution of the tripping heads, fingers 193 come into engagement with whatever lugs 87 of chains 85 and 86 happen to be passing by, and flip them to their feeding position for travel between the guides 116 and 117. It will be clear that if the tripping heads are rotated rapidly relative to the speed of travel of the chains, the spacing between successive lugs flipped into feeding position will be relatively small, and that if the tripping heads are rotated relatively slowly, the spacing between successive lugs flipped into feeding position will be relatively large. The speed of the tripping heads relative to the speed of travel of the chains may be varied as will be made clear. It will also be clear that as the frame 35 is adjusted transversely to vary the transverse spacing of the chains, the lug-tripping mechanism associated with the chain 86 moves along with the frame.

The auxiliary conveyor 15 comprises right and left hand parallel endless chains 201 and 203, each of which carries a plurality of feeding lugs 205 longitudinally spaced to accommodate the widest bag blank to be closed by the machine.

The right hand chain 201 is mounted for travel in a fixed vertical plane on rear and forward sprockets 207 and 209. The sprockets 207 and 209 are rotary on studs 211 and 213, respectively, fixed in a longitudinal table frame member 219. The left-hand chain is trained around rear and forward sprockets 215 and 217 mounted for rotation on a longitudinal member 221 of the adjustable frame 35. The chains 201 and 203 are driven by chain and sprocket drives from a shaft 223 extending transversely of the table and journalled in right and left hand bearings 225 and 227. The drive for the chain 201 comprises a chain 229 trained around a rear sprocket 231 forming a cluster with sprocket 209 and a forward sprocket 233 fixed on the shaft 223. The drive for the chain 203 comprises a chain 235 trained around a rear sprocket 237 forming a cluster with sprocket 217 and a forward sprocket 239 which is axially slidable but non-rotatably keyed to the shaft 223, as by having a square shaft aperture receiving a squared portion 241 of the shaft. The sprocket 239 is moved along the shaft with the frame 35 by a shifter fork 242 fixed to the frame. The shaft 223 is driven by a shaft 243 extending longitudinally of the right side of the table through an adjustable coupling 245 and a bevel gear drive generally designated 247. The shaft 243 is journalled at its forward end in a bearing pedestal 248 and has a sprocket 249 fixed thereon adjacent the pedestal.

Figure 6:
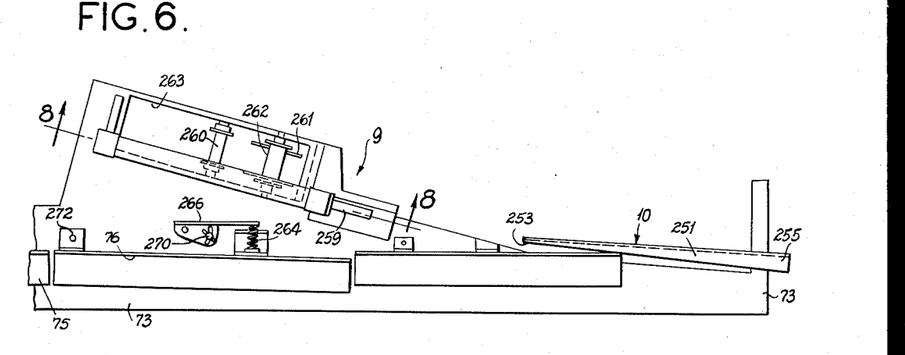
Fig. 6 is an enlarged plan view of left-side tape-supplying and folding devices.
Figure 7:
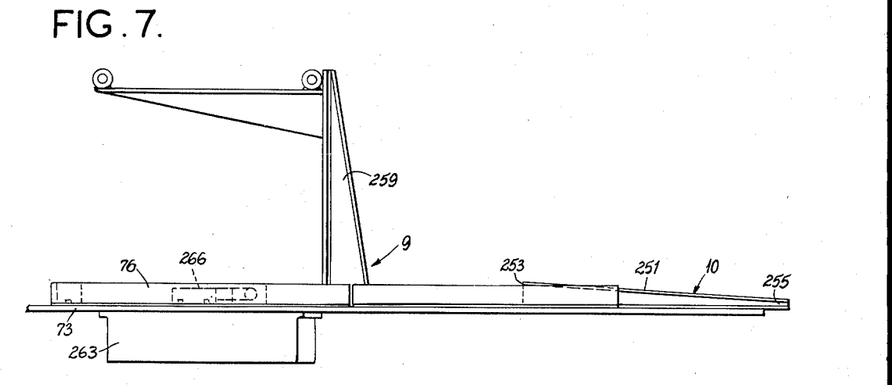
Fig. 7 is a side view of Fig. 6.
Figure 8:
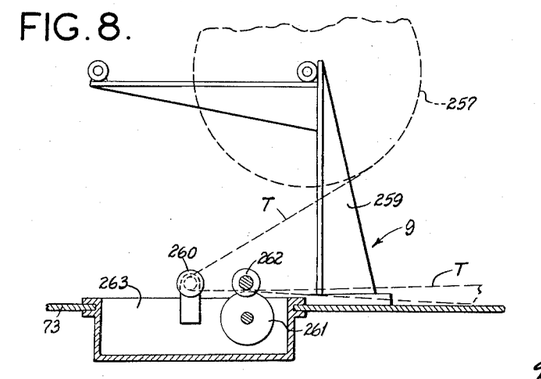
Fig. 8 is a section taken along the line 8—8 of Fig. 6 with a closure tape shown in dotted lines.

Each tape folding device comprises an elongate folder 251 extending generally longitudinally of the table. The folder varies in cross section from a straight vertical section 253 at its rearward end to a horizontal V-shaped section 255 at its forward end (Figs. 6-7). The opening of the V is directed inward. The folders are positioned for travel of the ends of the bag blanks therethrough. Continuous strips of tape T travel through the respective folders and are thereby folded around the ends of the bag blanks as the latter are fed along the table and through the folders. The tapes are supplied from tape rolls 257 carried by holders 259. The tapes are coated with paste prior to being drawn through the folders by guiding them over paste-applying rollers 261 rotary in a paste pot 263, guide rollers 260 and 262 being provided for this purpose. The folder, roll holder and paste-applying means of the right tape-supplying device 7 are mounted in fixed position on the fixed bed plate 63. The folder, roll holder and paste-applying means of the left tape-supplying device 9 are mounted on the bed plate 73 carried by the adjustable frame 35 so as to be movable with the frame for operation upon bag blanks of various lengths.

As shown in Fig. 6, the left edge guide 76 is movable and is spring biased inwardly by means of a spring 264 compressed between the guide and an adjustably pivoted arm 266. The amount of compression in the spring is determined by the position of the arm 266 which is held in position by a wing nut 270. The guide 76 is pivoted at its rear end on the plate 73 as indicated at 272. The right edge guide 69 is similarly biased inward (see Fig. 1). The guides 69 and 76 are normally inclined slightly inwardly so that as a bag blank is fed through the apparatus, the guide directs the blank tightly into the opposed tape folders 251 thereby causing the tapes T to be tightly folded around the ends of the blank.

Figure 9:
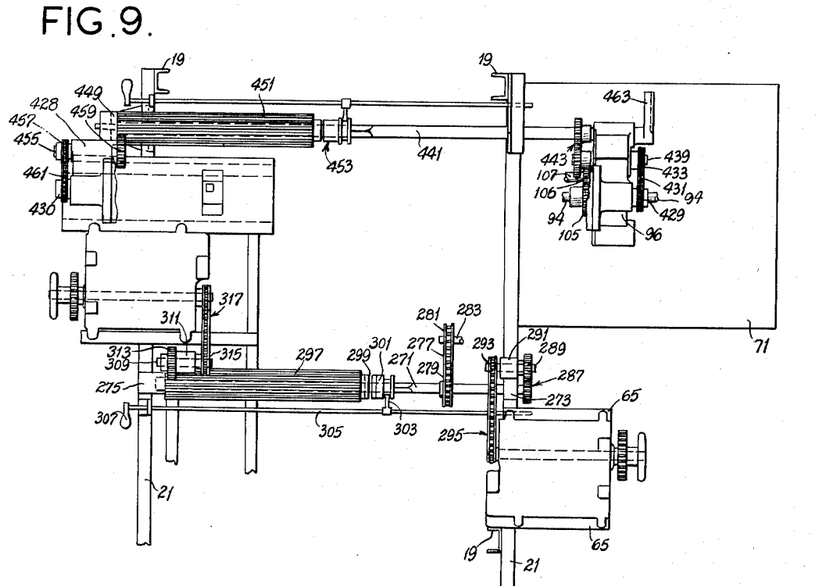
Fig. 9 is a plan view of certain parts of the apparatus particularly illustrating drive means for clippers and sewing machines of the apparatus.
Figure 13:
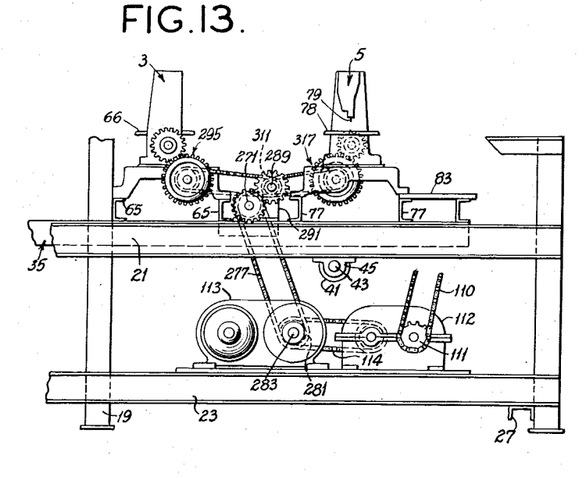
Fig. 13 is a side view of certain parts of the apparatus particularly illustrating the sewing machines.
Figure 14:
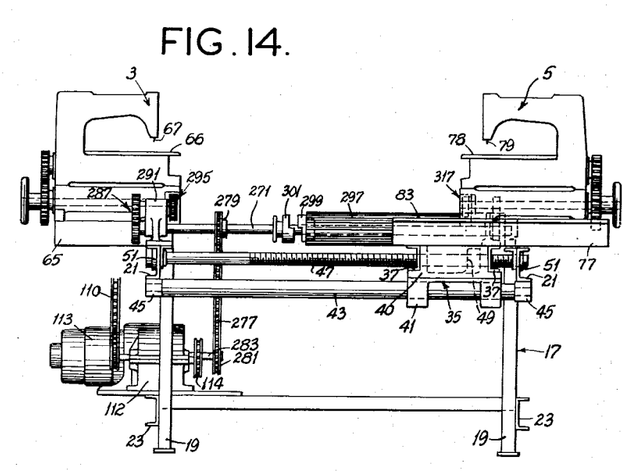
Fig. 14 is an end view of Fig. 13.

The sewing machines 3 and 5 are adapted to be continuously driven from a drive shaft 271 extending transversely of the table and journalled at its right and left hand ends in bearings 273 and 275 carried by the upper longitudinal bracing members of the table (Figs. 9, 13 and 14). A drive chain 277 is trained around a sprocket 279 on the shaft 271 and a sprocket 281 on the output shaft 283 of the variable speed motor unit 113. The shaft 271, at its right-hand end, is geared as indicated at 287 to drive a sprocket shaft 289 journalled in a bearing 291. Shaft 289 carries a sprocket 293 and drives the fixed sewing machine 3 through a chain and sprocket drive generally designated 295.

Rotary on the shaft 271 is an elongate or wide spur gear 297 having a clutch member 299 at one end. Slidably keyed on the shaft 271 is a clutch member 301 cooperable with the member 299 to drive the gear when members 299 and 301 are engaged. The member 301 is adapted to be moved into and out of engagement with member 299 by means of a shifter fork 303 carried by a clutch shifter rod 305 slidable transversely of the table and having a handle 307 at its left-hand end. A shaft 309 journalled in a bearing 311 mounted on the adjustable frame 35 carries a gear 313 slidably in mesh with the gear 297, and also carries a sprocket 315. The latter drives the sewing machine 5 through a chain and sprocket drive generally designated 317. The gear 313 slides along gear 297 as the frame 35 is adjusted.

The clippers or cutters 11 and 13 operate periodically in phase with the speed of conveyor 1 and the spacing of the feeding lugs 87 thereon. The cutters are of novel construction particularly for operation upon valved bags to remove segments of the tape between successive bags, rather than merely separating successive bag blanks. This is for the purpose of minimizing the length of tape extending from the valved corner of the bag.

Figure 15:
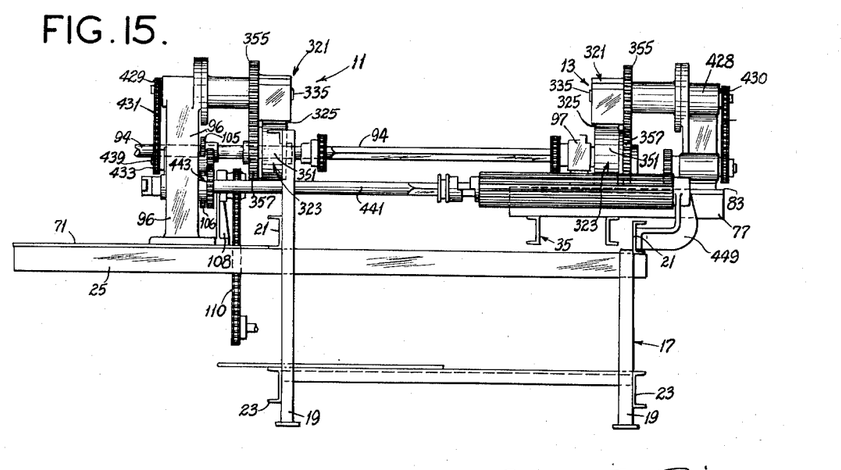
Fig. 15 is an end view of certain parts of the apparatus particularly illustrating the clippers.
Figures 16, 17:
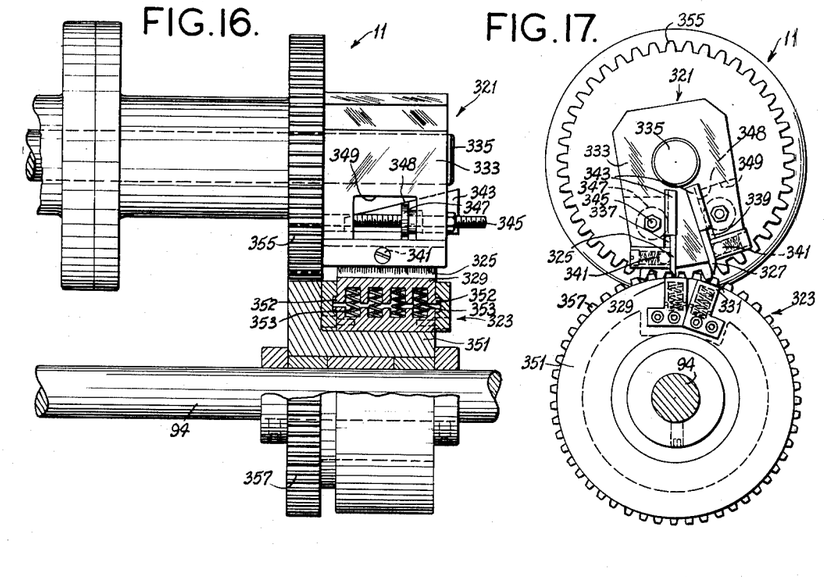
Fig. 16 is an enlarged partial section of a fixed clipper.
Fig. 17 is an end view of Fig. 16.
Figure 18:
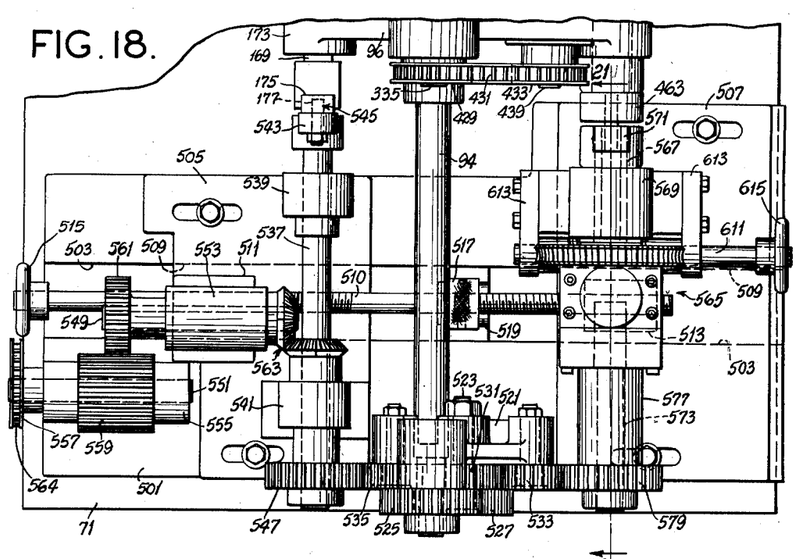
Fig. 18 is an enlarged plan view of a variable-drive transmission of the apparatus.

As illustrated more particularly in Figs. 15-17, the clipper 11 comprises upper and lower rotary cutter members generally designated 321 and 323, respectively. The upper cutter member 321 has a pair of angularly spaced transverse knives 325 and 327. The knife 325 is cooperable once each revolution with an anvil 329 of the lower cutter member. The latter also has a second anvil 331 angularly spaced from the anvil 329 with which the second knife 327 of the upper cutter member is cooperable once each revolution. The right-hand ends of the taped and stitched bag blanks travel along the plate 68 between the cutter members, which rotate in the direction of travel of the blanks. Plates 68 and 80 are apertured as at 328 to permit the rotary members to cooperate with one another (Fig. 1). Successive bag blanks are spaced from another, connected by short lengths L of tape and stitching strand. The cutters rotate in such relation to the travel of the blanks that the knife 325 of the upper cutter cuts through the tape and strand against the anvil 329 of the lower cutter across a line adjacent the trailing edge of a blank. Subsequently, the second knife 327 cuts through the tape and strand against the second anvil 331 adjacent the forward edge of the next successive blank. This cuts a segment out of the tape, which segment travels around the lower cutter member and falls away as waste. It will be noted that the second knife 327 trails the first knife 325 and that the second anvil 331 trails the first anvil 329.

The knives 325 and 327 are held in a knife block 333 which is fixed upon a transverse shaft 335. The shaft 335 is journalled in the upper portion of the right pedestal 96 and extends inwardly therefrom. The knives 325 and 327 are located in angularly spaced radial slots 337 and 339 in the knife block and are held in the slots by spring-biased ball detents generally designated 341. Wedges 343 are axially slidable in the slots and engage the backs of the knives. The wedges are axially slidable in the slots to vary the radius of the knife edges. For adjusting the wedges, screws 345 are fixed to extend axially in the knife block alongside the wedges. Adjusting nuts 347 are threaded on the screws and engage in grooves in the wedges indicated at 348. The nuts 347 are accessible for adjustment through openings 349 in the sides of the knife block 333. By turning a nut 347, it may be moved axially to move wedge 343 axially along the back of its associated knife thereby causing the knife to be moved toward or away from the axis of the knife block, as the case may be.

The anvils 329 and 331 are mounted for radial movement in axial slots in the periphery of a cylindrical anvil block 351. Outward movement of the anvils is limited by stops 352. Springs 353 bias each anvil radially outward while permitting the anvil to be moved radially inward when engaged by a knife. The knives are normally radially adjusted so as to move the respective anvils radially inward against the yielding bias of springs 353 during the cutting operation. This arrangement insures cutting of the tape and stitching strand for long periods of use even though the cutting edge of a knife is worn during use.

The anvil block 351 is freely rotatable upon the conveyor shaft 94. It is driven synchronously with the knife block 333 by means of a gear 355 fixed to the shaft 335 and in mesh with a driven gear 357 formed integral with the anvil block 351.

The left clipper 13 is substantially identical with the right clipper 11 and its parts are indexed by like reference characters. The left anvil block 351 and the associated gear 357 are freely rotatable upon the sleeve 103 carried in the bearing pedestal 97 (Fig. 12). The left anvil block is movable with the adjustable frame 35. The shaft 335 of the left cutter is journalled in a bearing pedestal 428 mounted on the outer end of the platform 83.

While both of the cutters may be utilized for cutting out segments of tape, generally only one is so employed. The other cutter is adapted for merely severing the closure material by removing one of its knives. The knife which is removed is determined by the position of the bag blanks on the conveyor. For example, if the blanks are positioned with the valve corners at the right side of the trailing edges thereof, as in Fig. 1, the trailing knife of the cutter 13 is removed. It will be noted that cutting action is obtained by moving the knife perpendicularly toward the tape and against the face of the anvil while all three parts are travelling in the same path at the same speed. Hence, displacement or disturbance of the moving tape and bag blanks is minimized and the tape is prevented from being unintentionally caught in the cutters.

Sprockets 429 and 430 are fixed to the outer ends of the upper shafts 335 of the right and left clippers, respectively. A chain 431 is trained around the right sprocket 429 and a sprocket 433 fixed upon a stub shaft 439 which is journalled in the right pedestal 96 (Fig. 10). The shaft 439 is geared to a clipper driving shaft 441 as indicated at 443. The clipper drive shaft 441 extends transversely across the table and is journalled at the right in the right pedestal 96 and at the left in a bearing in bracket 449 mounted upon the left longitudinal bracing member 21. A wide face gear 451 similar to the gear 297 previously described in connection with the sewing machine drive is rotary on the drive shaft 441 and is engageable therewith by means of a clutch 453 such as previously described in connection with the sewing machine drive. A shaft 455 journalled in the pedestal 428 carries an outer sprocket 457 and an inner gear 459 slidably in mesh with the elongate gear 451. The gear 459 slides along gear 451 upon transverse movement of the adjustable frame 35, which carries pedestal 428. The sprocket 457 drives a chain 461 trained around the sprocket 430 to power the left hand clipper 13. The right and left cutters are angularly positioned with their leading knives 325 aligned with one another so as to cut the respective tapes and stitching strands substantially simultaneously.

The clipper driving shaft 441 extends through the right pedestal 96 and carries a crank arm 463 similar to the crank arm 175 described in connection with the tripping mechanism drive. The crank arm 463 forms a part of a second swinging-block linkage of an adjustable variable-drive transmission.

Figs. 18–21 illustrate an adjustable transmission for driving the clippers, the lug tripping mechanism and the auxiliary conveyor in proper phase relationship. This transmission is mounted to the right of the pedestal 96 on the platform 71. Fixed on the platform 71 is a guide plate 501 having a guide slot 503 extending longitudinally of the table. A pair of slides 505 and 507 are carried by the guide plate at the rear and front thereof respectively. Each of the slides has a longitudinal guide rib 509 slidable in the slot 503. The rear slide 505 carries the drive for the lug tripping mechanism and the auxiliary conveyor. The forward slide 507 carries the drive for the clippers. The slides are longitudinally adjustable by means of a screw 510 extending longitudinally through a nut 511 associated with the slide 505 and a nut 513 associated with the slide 507. The screw has a right-hand thread at its forward end and a left-hand thread at its rearward end so that the slides are moved in opposite directions upon turning of the screw. The screw has a hand wheel 515 at its rearward end. A collar 517 fixed on the screw between the arms of a bearing yoke 519 fixed to the guide plate 501 prevents axial movement of the screw, and provides initial relative centering of slides 505 and 507.

The conveyor drive shaft 94 extends through the pedestal 96 to the end of the platform 71 where it is journalled in a bearing pedestal 521 mounted on the platform. The shaft 94 is geared to a stub shaft 523, journalled in the pedestal 521, by gears 525 and 527. A gear 531 fixed on the shaft 523 between the gear 527 and the pedestal drives forward and rear idler pinions 533 and 535, which are also rotatably carried by the pedestal 521.

The conveyor lug actuating mechanism is driven by a transverse drive shaft 537 journalled in bearings 539 and 541 on the rear slide 505. At its inner end, the shaft 537 carries a crank 543 having a pin and roller connection 545 with the slot 177 in crank 175. The outer end of the shaft 537 carries a removably keyed change gear 547 which is in mesh with the idler pinion 535 upon proper adjustment of the slide.

The auxiliary conveyor is driven from the shaft 537 through gearing including a pair of longitudinal stub shafts 549 and 551. Shaft 549 is movable with the rear slide 505, being journalled in a bearing 553 mounted on its associated nut portion 511. The shaft 551 is journalled in a bearing 555 fixed on the guide plate 591 and has a sprocket 557 fixed at its rearward end. A wide face gear 559 on the fixed shaft is driven by a gear 561 on the movable shaft. The movable shaft 549 is geared at its forward end to the transverse shaft 537 through bevel gears 563. A chain 564 is trained around sprocket 557 and the sprocket 249 on the lay shaft 243.

The arrangement automatically drives the auxiliary conveyor 15 at a speed controlled as a function of the speed of the primary conveyor and the spacing of the feeding lugs thereon. For example, if the tripping mechanism is driven at an increased speed, the auxiliary conveyor is also driven at an increased speed so that its lugs 205 will cooperate with the lugs 87 which are tripped at an increased rate. Thus, the spacing between the bag blanks is maintained uniform for different widths of the blanks. The adjustable coupling on shaft 243 permits the auxiliary conveyor lugs 205 to be positioned with respect to the predetermined selection of feeding lugs 87 so as to properly pass a bag blank from the former to the latter. The adjustable coupling may be replaced by an adjustable differential coupling of a type to be described, if it is desired to make this adjustment during operation of the apparatus.

The transmission elements for driving the clipper drive shaft 441 include an adjustable differential coupling generally designated 565. The differential provides means for adjusting the timing of the clipper cutting operation with respect to the position of bag blanks carried by the conveyor 1, as will appear. A hollow driving shaft 567, substantially aligned with and adjacent the clipper drive shaft 441, is journalled in a bearing 569 mounted on the forward slide 507. The driving shaft carries a crank arm 571 at its inner end which cooperates with the crank arm 463 of the clipper drive shaft through a pin and slot connection. A transverse shaft 573 is journalled in the hollow shaft 567 by bearings 575 in the hollow shaft. The shaft 573 extends outwardly from the shaft 567 through a bearing pedestal 577. A change gear 579, similar to the change gear 547, is removably keyed upon the outer end of shaft 573 to mesh with the idler pinion 533 upon proper adjustment of the slide 507. The hollow shaft 567 is driven by the shaft 573 through the differential 565.

Figure 20:
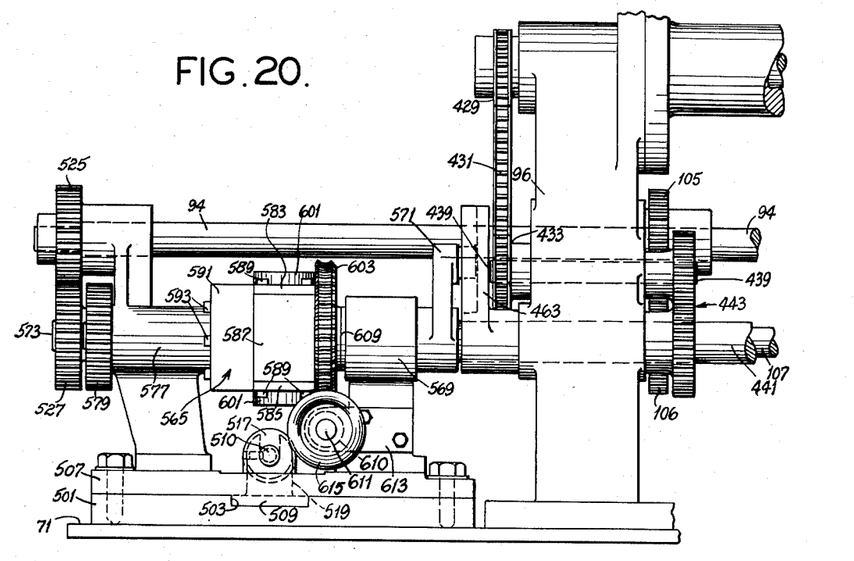
Fig. 20 is an end view of Fig. 18.
Figure 21:
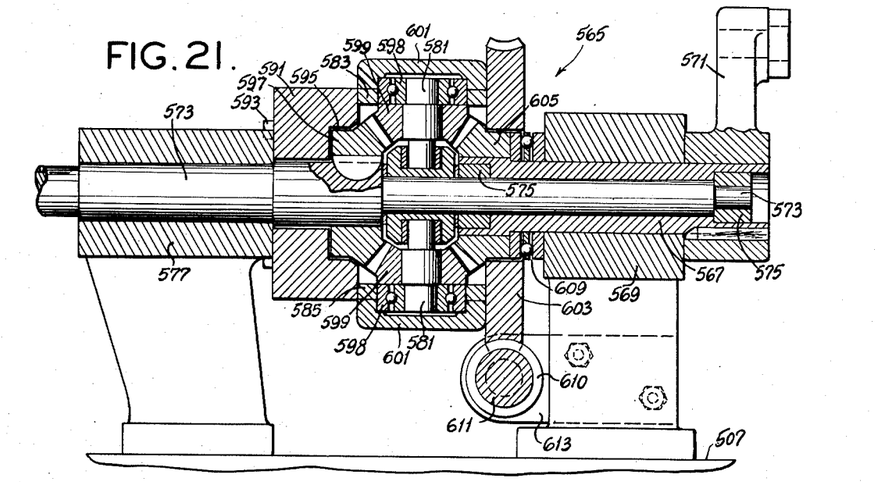
Fig. 21 is an enlarged section taken on line 21—21 of Fig. 18.

The differential is housed in a rotatable box having top and bottom plates 583 and 585 secured to side plates 587 by bolts 589 (Fig. 20). An outer end plate 591, centrally apertured to receive the shaft 573, is secured to the side plates 587 by bolts 593. The end plate 591 is counterbored at 595 to receive a bevel gear 597 keyed to the shaft 573. The top and bottom plates 583 and 585 are apertured to receipe ball bearings 598 in which are journalled shafts 581 for bevel idler pinions 599. Caps 601 cover the bearings and apertures in the top and bottom plates. A worm wheel 603 is affixed to the inner end of the differential housing. The wheel 603 is apertured to receive the shaft 567 and a bevel gear 605 on the shaft, which gear meshes with the idler pinions 599 driven by the gear 597. A thrust bearing 609 is interposed between the gear 605 and the bearing pedestal 569. The worm wheel is turned by a worm 610 on a worm shaft 611 journalled in brackets 613 extending from the pedestal 569. The worm shaft is provided with hand wheel 615.

Figure 19:
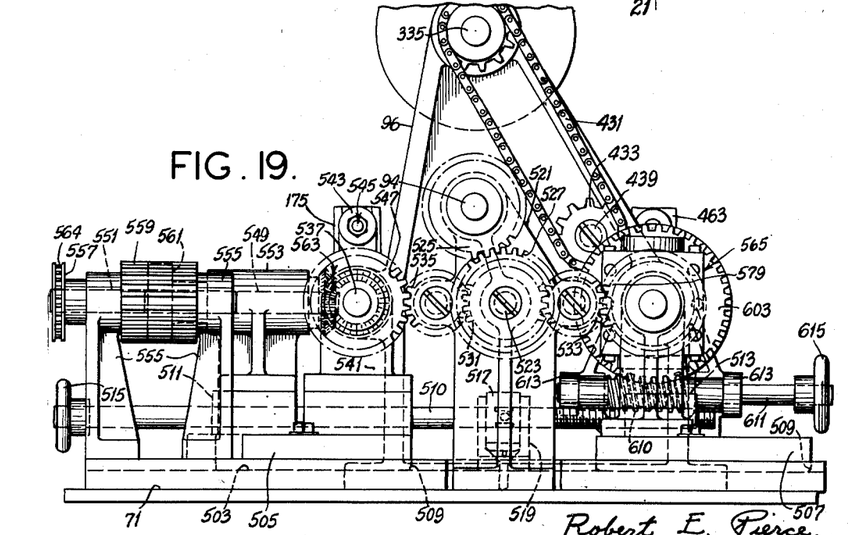
Fig. 19 is a side view of Fig. 18.

As the hand wheel 615 is turned, the worm wheel 603 is rotated, for example, clockwise as viewed in Fig. 19. The worm wheel rotates the differential housing including the idler pinions journalled therein about the common axis of the shafts 567 and 573. The bevel idler pinions in mesh with bevel gear 597 of shaft 573 are driven by the gear 597. The upper and lower pinions rotate about their axes clockwise and counterclockwise respectively, as viewed from the top, thereby driving the bevel gear 605 of shaft 567 clockwise as viewed in Fig. 19. The shaft 567 is thereby angularly repositioned with respect to the shaft 573, and the clippers are angularly repositioned with respect to predetermined points on the primary conveyor, such as the pre-selected ones of feeding lugs 87. Though the shaft 573 is considered to be stationary in the above description of the adjustment, it is to be understood that the adjustment may be made during operation of the machine.

The adjustable swinging-block linkage is employed in combination with the variable ratio gear train (removable change gears 547 and 579) to provide a transmission for the periodically operated cutter and lug-tripping mechanism which permits the time intervals between operations to be varied without changing the speed of operative movement thereof. The portion of the transmission driving the lug-tripping mechanism is arranged to cause the tripping fingers 193 to strike a lug at the same speed while permitting variable selection of lugs to be tripped in accordance with the width of the bag blanks fed through the apparatus. Such uniformity of striking speed is desirable to insure that a lug is struck with sufficient force to be raised while not struck so hard that it will rebound back to a lateral position. Similarly, the transmission portion driving the cutters is arranged to cause the cutting knives to move at a constant peripheral speed, equal to the peripheral speed of the conveyor 1, during the cutting operation, while permitting the elapsed time per revolution to be variably adjusted in accordance with the width of the bag blanks. A general description of how the cutter driving means is adjusted for operation on bag blanks of relatively greater width follows:

The hand wheel 515 is turned to move the slide 507 and the parts carried thereby away from the idler pinion 533 so that a larger change gear 579 may be fitted to the shaft 573. The larger change gear reduces the rotation speed of the shafts 573 and 567, and thereby increases the elapsed time between cutting operations. The driving shaft 567 and its crank 571 are also shifted with respect to the driven clipper drive shaft 441 and its crank 463. This in turn results in the shaft 441 being driven with a relatively greater angular velocity during the left portion of its revolution as the shaft is viewed from the right. This component of increased angular velocity is related to the rotation of the cutters through the associated gearing and chain drives so that the cutters tend to rotate with increased peripheral speed during the cutting operation. However, the increased component of angular velocity of shaft 441 resulting from the quick-return movement of the swinging-block linkage is counteracted by the overall decrease of angular velocity resulting from the larger change gear 579. Furthermore, the size of the change gear is so related to the radial offset in the swinging-block linkage, that the two components of speed variation substantially cancel one another. Thus, the peripheral speed of the cutting knife remains substantially constant and equal to the peripheral speed of the conveyor 1 during the cutting operation, irrespective of the change gear employed or the time interval between cutting operations. That portion of the transmission driving the lug-tripping mechanism is adjusted to operate in a similar fashion. It has been found desirable to have the apparatus arranged so that the spacing between the feeding lugs on the conveyor 1, measured in inches, is equal to the number of teeth on the change gear.

Operation is as follows:

The crank wheel 61 at the rearward end of the table is turned to move the frame 35 to the desired position for a run of bag blanks B of a given length. The various bag closing elements carried by the movable frame 35 are thus positioned to operate upon the left-hand ends of the bag blanks. Similarly the primary conveyor chain 86 and auxiliary conveyor chain 203 are properly positioned. After adjustment of the frame 35, the longitudinal bars 31 are transversely spaced in the slots 33 to support the central portion of the bag blanks.

Adjustment of the apparatus for the width of the bag blanks is made at the adjustable transmission as previously described. The lugs 205 on the auxiliary conveyor 15 are properly positioned relative to the upright lugs of the conveyor 1 by adjustment at the coupling 245 in the auxiliary conveyor drive. It will be noted that the overall speed of the apparatus is controlled by the variable speed motor unit 113.

A bag blank B is placed upon the auxiliary conveyor 15 transversely thereof. The feeding lugs 205 of the auxiliary conveyor push the blank forward on to the moving primary conveyor 1. As lugs 205 move forward, the tripping mechanism trips an aligned pair of lugs 87 of the primary conveyor into an upright position which lugs are carried upward around the rear sprockets 87 and 99 by the conveyor. As the auxiliary conveyor lugs 205 reach the end of their feeding path, the upwardly moving lugs of the primary conveyor engage the trailing edge of the blank and push it forward. Bag blanks are placed upon the auxiliary conveyor as fast as it clears itself.

Each blank is aligned for the subsequent closure operations as it passes between the guides 64 and 75. The tapes T are manually applied to the first blank of a given run. Thereafter, the forward movement of the blank with the tapes T secured thereto causes the tapes to be withdrawn from the respective supply rolls 257, pass over the paste-applying rollers 261 and travel through the folders 251, where they are folded about and secured upon the respective open marginal edges of the successive blanks. As the blanks pass through the folders, they are pushed tightly into the folders by the opposed pusher guides 69 and 76. As previously noted, there is a relatively small spacing between successive blanks passing through the folders which results in each tape being folded upon itself to form tape connecting lengths L. The tape connecting lengths are longer at the right than at the left because of the valve construction at the right forward corner of the blanks.

Continuing forward, the blanks pass through the sewing machines 3 and 5 where the tapes and bag blank sides are stitched together. The sewing machines operate continuously on the tape connecting lengths L as well as on the bags proper.

Upon leaving the sewing machines, the blanks pass through the periodically operative clippers 11 and 13 positioned at the end of the conveyor 1. The clippers are adjusted so that their knives reach their cutting position immediately after the passage of the lugs 87. This arrangement provides for cutting action upon the tape connecting lengths L. The right clipper 11, having two knives 325 and 327 spaced to cut at different times, removes segments of tape and stitching cord thereby minimizing the amount of closure material extending from the blank at the right edge, particularly at the valve corner. The left clipper 13 having a single knife 325 merely separates the successive bag blanks. The finished bag is then carried off in a suitable manner such as by another conveyor.

If it is desired to close only one end of the blanks, the left closure elements may be disengaged. The left conveyor chain is employed and is adjusted for the bag blank length as before. The left sewing machine 5 is disengaged at its clutch members 299 and 301. The left clipper 13 is disengaged at its clutch 453. The ends of the blanks which are to be closed are then run through the right closure elements. Also, the tape supplying and folding devices or the sewing machines may be omitted, if desired.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. Bag closure apparatus comprising an opposed pair of sewing machines mounted for relative movement toward and away from one another for stitching closed the ends of open-ended flat tubular bag blanks of various lengths fed through the apparatus with their open ends travelling under the needles of the machines, and means for feeding bag blanks of various lengths through the sewing machines comprising a pair of parallel endless chains having feeding lugs thereon, the chains being mounted for relative transverse movement toward and away from one another.

2. Bag closure apparatus comprising an opposed pair of sewing machines mounted for relative movement toward and away from one another for stitching closed the ends of open-ended flat tubular bag blanks of various lengths fed through the apparatus with their open ends travelling under the needles of the machines, means for feeding bag blanks of various lengths through the sewing machines comprising a pair of parallel endless chains having feeding lugs thereon, the chains being mounted for relative transverse movement toward and away from one another, an opposed pair of closure tape folding devices mounted for relative movement toward and away from one another for folding closure tapes around the open ends of bag blanks of various lengths as they are fed to the sewing machines by said means so that the tapes become stitched to the blanks, and an opposed pair of cutters mounted for relative movement toward and away from one another for cutting the stitching strands and tapes between successive bag blanks after they have been stitched.

3. Bag closure apparatus comprising a table, means for feeding open-ended flat tubular bag blanks one after another along the top of the table with the blanks extending transversely to the direction of feed, and an opposed pair of sewing machines carried by the table for stitching closed the open ends of blanks as they travel along the table, one of said sewing machines being fixed with respect to the table and the other being mounted for transverse adjustment toward and away from said fixed machine for operation upon blanks of various lengths, the means for feeding the blanks comprising a pair of parallel endless chains extending lengthwise of the table and having feeding lugs thereon, one of said chains being carried by the table for travel in a fixed vertical plane and the other being mounted for transverse movement toward and away from the fixed chain along with the adjustable sewing machine.

4. Bag closure apparatus comprising a table, means for feeding open-ended flat tubular bag blanks one after another along the top of the table with the blanks extending transversely to the direction of feed, a sewing machine carried in fixed position at one side of the table for stitching closed one end of each of the blanks as they travel along the table, a tape folding device carried in fixed position at said one side of the table for folding a closure tape around said one end of each of the blanks as they travel along the table to the sewing machine, a frame carried by the table for transverse adjustment toward and away from said one side of the table, a sewing machine carried by the frame opposed to the fixed sewing machine for stitching closed the other end of each of the blanks as they travel along the table, and a tape folding device carried by the frame opposed to the fixed folding device for folding a closure tape around said other end of each of the blanks as they travel along the table to the sewing machines, the frame being transversely adjustable to move the sewing machine and tape folding device carried thereby to different positions for operation upon blanks of various lengths.

5. Bag closure apparatus comprising a table, means for feeding open-ended flat tubular bag blanks one after another along the top of the table with the blanks extending transversely to the direction of feed, a sewing machine carried in fixed position at one side of the table for stitching closed one end of each of the blanks as they travel along the table, a tape folding device carried in fixed position at said one side of the table for folding a closure tape around said one end of each of the blanks as they travel along the table to the sewing machine, a cutter carried in fixed position at said one side of the table for cutting the stitching strand and tape at said side of the table between successive bag blanks after they have been stitched, a frame carried by the table for transverse adjustment toward and away from said one side of the table, a sewing machine carried by the frame opposed to the fixed sewing machine for stitching closed the other end of each of the blanks as they travel along the table, a tape folding device carried by the frame opposed to the fixed folding device for folding a closure tape around said other end of each of the blanks as they travel along the table to the sewing machine carried by the frame, and a cutter carried by the frame for cutting the stitching strand and tape at the said other ends of the blanks between successive blanks after they have been stitched, the frame being transversely adjustable to move the sewing machine, tape folding device and cutter carried thereby to different positions for operation upon blanks of various lengths.

6. Bag closure apparatus are set forth in claim 5, wherein the means for feeding the blanks comprises a pair of parallel endless chains extending lengthwise of the table and having feeding lugs thereon, one of said chains being carried by the table for travel in a fixed vertical plane and the other being carried by the frame for transverse movement toward and away from the fixed chain along with the adjustable sewing machine, folding device and cutter.

7. In bag closure apparatus, a cutter for cutting a longitudinal strip of bag closure material comprising a rotary member having a transverse knife-receiving slot, a knife held within the outer portion of the knife-receiving slot for movement toward and away from its axis of rotation, a transversely movable wedge in the inner portion of the slot backing said knife, and a transverse screw controlling the transverse movement of the wedge for adjustably positioning the knife with respect to its axis of rotation.

8. In bag closure apparatus adapted to apply a substantially continuous length of bag closure material to bag blanks fed successively through the apparatus, a feed for feeding bag blanks of different dimensions in the direction of feed one after the other, a rotary cutter for periodically cutting the closure material between successive blanks, an adjustable drive transmission interconnecting the feed and the cutter, a variable ratio drive in the transmission for variably controlling the timing of the cutting operation as a function of the speed of the feed, and an adjustable quick-return movement in the transmission for substantially counteracting the variations in the rotary speed of the cutter during the cutting operation resulting from the variable ratio drive, whereby the peripheral speed of the cutter during the cutting operation is maintained substantially equal to the speed of the feed irrespective of the ratio of the variable drive.

9. Bag closure apparatus as set forth in claim 8 wherein the quick-return movement comprises an adjustable swinging-block linkage, the radial offset of which is variably controlled as a function of the ratio of the variable drive in the transmission.

10. In bag closure apparatus adapted to apply a substantially continuous length of bag closure material to bag blanks fed successively through the apparatus, an endless belt conveyor for feeding bag blanks of various dimensions in the direction of feed one after the other, a driving shaft for the conveyor, a rotary cutter for periodically cutting the closure material applied to the blanks between successive blanks, a driving shaft for the rotary cutter, a transmission interconnecting the conveyor drive shaft and the cutter drive shaft, a variable ratio gear train in the transmission for varying the rotary speed of the cutter with respect to the speed of the conveyor, whereby the time intervals between cutting operations may be controlled in accordance with the dimensions of the bag blanks in the direction of feed and the speed of the feed, and an adjustable differential coupling in the transmission for angularly positioning the cutter drive shaft with respect to the conveyor drive shaft whereby the cutting operation is timed to occur immediately after the passage of a bag blank and prior to the passage of a succeeding blank.

11. In bag closure apparatus adapted to apply a substantially continuous length of bag closure material to bag blanks fed successively through the apparatus, an endless belt conveyor for feeding bag blanks of various dimensions in the direction of feed one after the other, a driving shaft for the conveyor, a rotary cutter for periodically cutting the closure material applied to the blanks between successive blanks, a driving shaft for the rotary cutter, a radially movable shaft intermediate the conveyor drive shaft and the cutter drive shaft, said intermediate shaft being connected to one of the drive shafts through an adjustable swinging-block linkage and to the other drive shaft through a variable ratio gear train having a change gear, said intermediate shaft being radially movable to accommodate different change gears and effect different degrees of offset in the swinging-block linkage, the variations in speeds caused by the variable ratio gear train and the swinging-block linkage being so related that the peripheral speed of the cutter during the cutting operation is maintained substantially equal to the peripheral speed of the conveyor irrespective of the change gear utilized.

12. In bag closure apparatus adapted to apply a substantially continuous length of bag closure material to bag blanks fed successively through the apparatus, an endless belt conveyor having variably positionable feeding lugs for feeding bag blanks of different dimensions in the direction of feed one after the other with uniformly maintained spacing between blanks, a periodically operative mechanism for selectively positioning the feeding lugs, a periodically operative cutter for cutting the closure material applied to the bag blanks between successive blanks, and a variable ratio drive interconnecting the conveyor, the feeding lug selecting mechanism, and the cutter for variably controlling the selection of the feeding lugs and the timing of the cutting operation as a function of the conveyor speed, whereby the cutting operation is timed with respect to the position of the blanks fed by the feed and the dimensions of the blanks in the direction of feed.

13. In bag closure apparatus, a primary endless conveyor for feeding bag blanks of different dimensions successively through the apparatus, said primary conveyor having feeding lugs which are selectively positionable in accordance with the dimensions of the bag blanks in the direction of feed, a drive for the primary conveyor, an auxiliary endless conveyor for feeding the bag blanks to the primary conveyor, said auxiliary conveyor having feeding lugs fixed thereon, a drive for the auxiliary conveyor, a variable ratio transmission interconnecting the primary conveyor drive and the auxiliary conveyor drive for varying the speed of the auxiliary conveyor with respect to the speed of the primary conveyor, whereby the speed of the auxiliary conveyor is adjusted with respect to the predetermined selection of feeding lugs on the primary conveyor so that the feeding lugs fixed on the auxiliary conveyor cooperate with the feeding lugs on the primary conveyor.

14. Bag closure apparatus as set forth in claim 13 further including an adjustable coupling in the variable ratio transmission for positioning the feeding lugs on the auxiliary conveyor with respect to the feeding lugs on the primary conveyor.

15. Bag closure apparatus comprising means for feeding open-ended flat tubular bag blanks of various lengths one after another in a predetermined path with the blanks extending transversely to the direction of feed, said means comprising a pair of parallel endless chains having feeding lugs thereon, a pair of sewing machines positioned at opposite sides of said path for stitching closed the ends of the blanks as they are fed, a pair of tape folding devices positioned at opposite sides of said path for folding closure tapes around the ends of the blanks as they are fed, and a pair of cutters at opposite sides of said path for cutting the stitching strands and tapes between successive blanks after they have been stitched, the chain, the sewing machine, the tape folding device and the cutter on one side of said path all being mounted on a common support which is adjustable transversely with respect to said path to adjust the apparatus for operation on various sizes of blanks while maintaining the longitudinal alignment of the sewing machines, tape folders and cutters.

16. Bag closure apparatus comprising means for feeding open-ended flat tubular bag blanks one after another in a predetermined path with the blanks extending transversely to the direction of feed and spaced apart in the direction of feed, means for applying continuous closure tapes to the ends of the blanks as they are fed, and cutters for cutting the tapes between successive blanks, each cutter comprising a knife extending transverse to the direction of feed and rotary on an axis transverse to the direction of feed, and an anvil extending transverse to the direction of feed and rotary on an axis transverse to the direction of feed, the tapes travelling between the knife and the anvil and the knife and anvil being cooperable to cut the tapes between successive blanks, and means for rotating the knife and anvil in the direction of feed with the knife and anvil phased for cutting engagement upon each revolution thereof.

17. Bag closure apparatus comprising means for feeding open-ended flat tubular bag blanks one after another in a predetermined path with the blanks extending transversely to the direction of feed and spaced apart in the direction of feed, means for applying continuous closure tapes to the ends of the blanks as they are fed, and cutters for cutting the tapes between successive blanks, each cutter comprising a knife extending transverse to the direction of feed and rotary on an axis transverse to the direction of feed, an anvil holder rotary on an axis transverse to the direction of feed, an anvil carried by the holder for movement toward and away from the axis of the anvil holder and extending transverse to the direction of feed, means yieldingly biasing the anvil away from the axis of the anvil holder to an outer limiting position such that upon engagement of the knife with the anvil, the anvil is moved inward against its bias, and means for rotating the knife and anvil holder in the direction of feed with the knife and anvil phased for cutting engagement upon each revolution thereof.

18. Bag closure apparatus comprising means for feeding open-ended flat tubular bag blanks one after another in a predetermined path with the blanks extending transversely to the direction of feed and spaced apart in the direction of feed, means for applying continuous closure tapes to the ends of the blanks as they are fed, a pair of cutters for cutting the respective tapes between successive blanks, one cutter comprising a rotary knife and a cooperating rotary anvil extending transverse to the direction of feed and rotary on parallel axes to transverse to the direction of feed, the other comprising a rotary pair of knives and a rotary pair of anvils extending transverse to the direction of feed, the pair of knives being rotary on an axis extending transverse to the direction of feed and angularly spaced from one another, the pair of anvils being rotary on an axis extending transverse to the direction of feed and angularly spaced in correspondence with the pair of knives, and means for rotating the knives and anvils in the direction of feed.

19. Bag closure apparatus comprising means for feeding open-ended flat tubular bag blanks one after another in a predetermined path with the blanks extending transversely to the direction of feed and spaced apart in the direction of feed, means for applying continuous closure tapes to the ends of the blanks as they are fed, cutters for cutting the tapes between successive blanks, each cutter comprising a rotary knife and a cooperating rotary anvil extending transverse to the direction of feed and rotary on parallel axes transverse to the direction of feed, and means for driving the knives and anvils in the direction of feed with the knives and anvils phased for engagement upon each revolution thereof to cut the tapes between successive blanks, and with their peripheral speed equal to the speed of the feed during each cutting operation.

20. Bag closure apparatus as set forth in claim 19 wherein the means for driving the cutters includes a variable ratio drive, the input of which is connected to the means for feeding the blanks and the output of which is connected to the cutters.

21. Bag closure apparatus as set forth in claim 20 wherein the variable ratio drive includes an adjustable differential coupling for adjusting the phasing of the cutters with respect to the feed.

22. Bag closure apparatus comprising means for feeding open-ended flat tubular bag blanks of various lengths one after another in a predetermined path with the blanks extending transversely to the direction of feed, a pair of tape folding devices positioned at opposite sides of said path for folding closure tapes around the ends of the blanks as they are fed, a pair of cutters at opposite sides of said path for cutting the tapes between successive blanks after they have been taped, each cutter comprising a knife extending transverse to the direction of feed and rotary on an axis transverse to the direction of feed, and an anvil extending transverse to the direction of feed and rotary on an axis transverse to the direction of feed, the tapes travelling between the knife and the anvil and the knife and anvil being cooperable to cut the tapes between successive blanks, and means for rotating the knife and anvil in the direction of feed with the knife and anvil phased for cutting engagement upon each revolution thereof, the tape folding device and the cutter on one side of said path both being mounted on a common support which is adjustable transversely with respect to said path to adjust the apparatus for operation on various sizes of blanks while maintaining the longitudinal alignment of the tape folders and cutters.

23. Bag closure apparatus comprising means for feeding open-ended flat tubular bag blanks of various lengths one after another in a predetermined path with the blanks extending transversely to the direction of feed, a pair of tape folding devices positioned at opposite sides of said path for folding closure tapes around the ends of the blanks as they are fed, a pair of sewing machines positioned at opposite sides of said path for stitching closed the ends of the blanks as they are fed after application of the tapes thereto, a pair of cutters at opposite sides of said path for cutting the tapes and stitching strands between successive blanks after they have been taped and stitched, each cutter comprising a knife extending transverse to the direction of feed and rotary on an axis transverse to the direction of feed, and an anvil extending transverse to the direction of feed and rotary on an axis transverse to the direction of feed, the tapes and stitching strands travelling between the knife and the anvil and the knife and anvil being cooperable to cut the tapes and stitching strands between successive blanks, and means for rotating the knife and anvil in the direction of feed with the knife and anvil phased for cutting engagement upon each revolution thereof, the tape folding device, the sewing machine and the cutter on one side of said path all being mounted on a common support which is adjustable transversely with respect to said path to adjust the apparatus for operation on various sizes of blanks while maintaining the longitudinal alignment of the tape folders, sewing machines and cutters.

ROBERT E. PIERCE.

REFERENCES CITED

The following references are of record in the file of this patent:

UNITED STATES PATENTS

| Number | Name | Date |
| --- | --- | --- |
| 1,780,005 | Crawford | Oct. 28, 1930 |
| 1,840,232 | Hartman | Jan. 5, 1932 |
| 1,884,032 | Maier | Oct. 25, 1932 |
| 1,948,796 | Muller | Feb. 27, 1934 |
| 1,989,943 | Potdevin | Feb. 5, 1935 |
| 2,260,191 | Orr | Oct. 21, 1941 |
| 2,314,431 | Strike | Mar. 23, 1943 |
| 2,336,957 | Pierce | Dec. 14, 1943 |